June 24, 1941.  J. D. ROMANO ET AL  2,247,135
CONTROL SWITCH FOR VEHICLE DIRECTION SIGNALS
Filed July 21, 1938  2 Sheets-Sheet 1
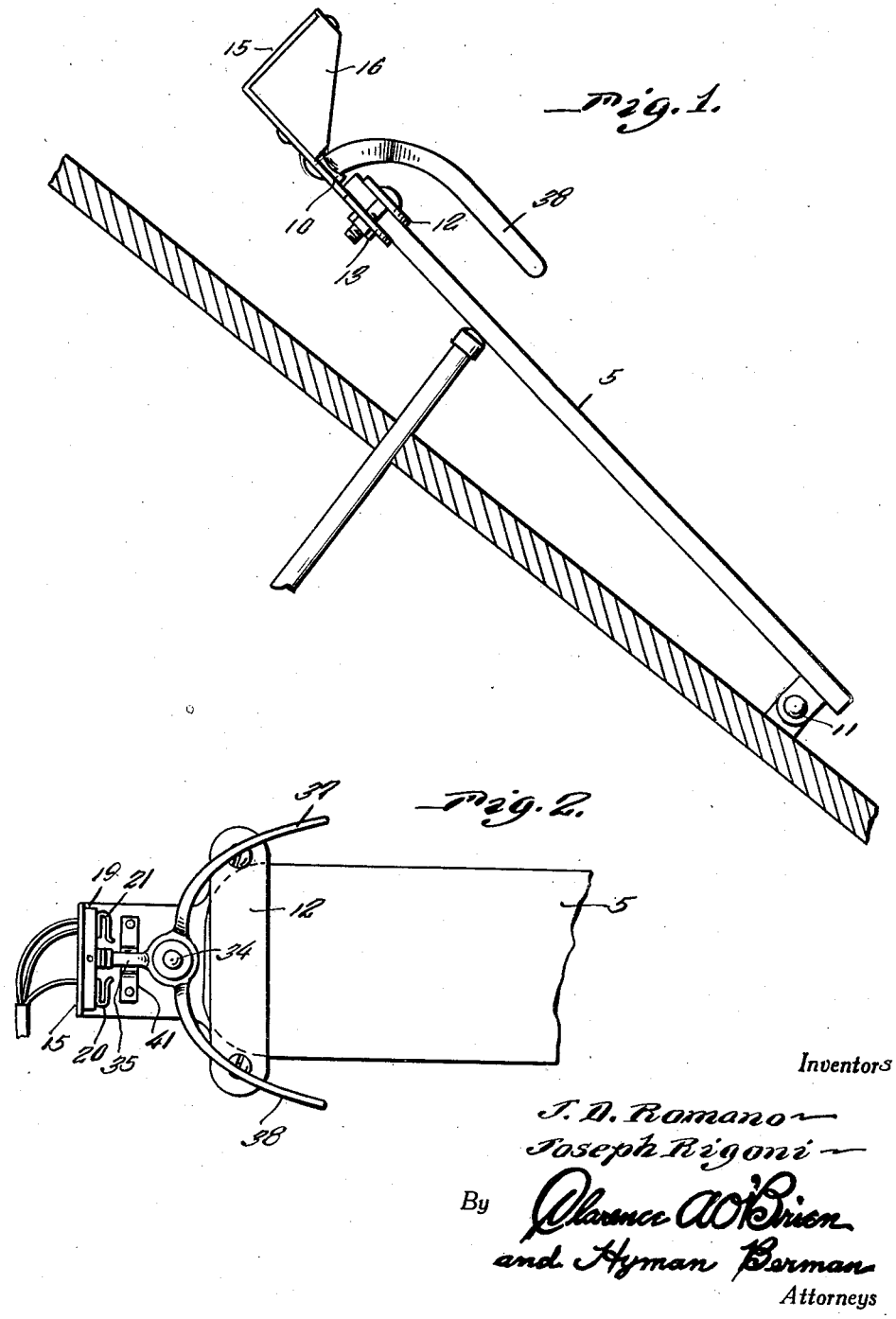
Inventors
J. D. Romano
Joseph Rigoni
By Clarence A. O'Brien
and Hyman Berman
Attorneys June 24, 1941.   J. D. ROMANO ET AL   2,247,135
CONTROL SWITCH FOR VEHICLE DIRECTION SIGNALS
Filed July 21, 1938   2 Sheets-Sheet 2
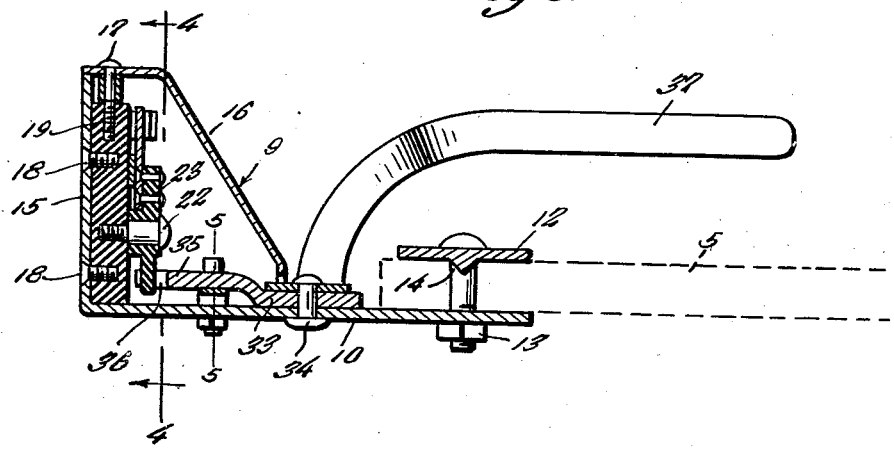
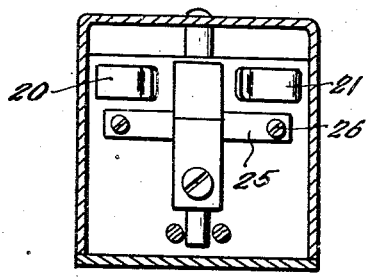
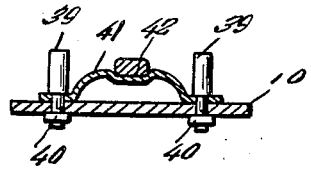
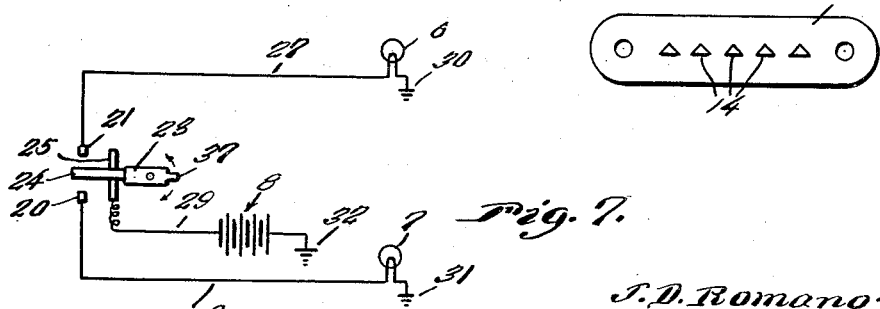
Inventors
J. D. Romano
Joseph Rigoni
By Clarence A. O'Brien
and Hyman Berman
Attorneys Patented June 24, 1941

2,247,135

UNITED STATES PATENT OFFICE 2,247,135

CONTROL SWITCH FOR VEHICLE DIRECTION SIGNALS

Joseph D. Romano and Joseph Rigoni, Marseilles, Ill.

Application July 21, 1938, Serial No. 220,578

3 Claims. (Cl. 200—59)

This invention relates broadly to direction signals for automobiles of the type employed for indicating the intention of the operator of the vehicle to change his course of travel to either the right or left.

More particularly the invention has reference to an improved switch for electrically operable signals of the character suggested.

In accordance with the present invention a switch is provided which may be readily mounted on the accelerator pedal of the automobile so as to be easily and conveniently operated by the foot of the operator of the vehicle.

The invention together with its objects and advantages will be best understood from a study of the following description taken in connection with the accompanying drawings wherein:

Figure 1 is a side elevational view illustrating the application of the invention, Figure 2 is a top plan view illustrating the invention with the casing for the switch proper removed, Figure 3 is a sectional view taken through the switch and associated parts, Figures 4 and 5 are detail sectional views taken substantially on the lines 4—4 and 5—5 respectively of Figure 3, Figure 6 is a bottom plan view of a clamping plate and Figure 7 is a diagram of the wiring system.

Referring to the drawings by reference numerals it will be seen that 5 indicates generally the accelerator pedal of an automobile while the reference numerals 6 and 7 indicate incandescent lamps forming part of right and left-turn signals as usually mounted at the rear of an automobile for indicating the intention of the operator of the vehicle to change his course of travel either toward the right or toward the left.

The lamps 6 and 7 are arranged in a suitable battery circuit, the battery or source of electric current supply being indicated by the reference numeral 8.

The improved control switch for the signal lamps 6 and 7 is indicated generally by the reference numeral 9.

In accordance with the present invention the control switch assembly 9 comprises a main body plate 10 which at one end is adapted to be disposed against the underside of the accelerator pedal 5 at the end of the pedal 5 farthest remote from its pivot 11. Cooperating with said end of the body plate 10 is a clamping plate 12 that is disposed transversely of the pedal 5 at the topside of the pedal.

Plates 10 and 12 project laterally beyond the longitudinal edges of the pedal 5 and are secured together through the medium of bolts 13 as shown.

To prevent slipping of the switch structure longitudinally or laterally relative to the pedal 5 plate 12 on the underside thereof is provided with a longitudinal series of prongs 14 that are adapted to pierce the pedal 5 in a manner suggested in Figure 3.

At the free end thereof plate 10 is provided with an upstanding flange 15 that forms one wall of a switch casing 16 which casing 16 is detachably secured on the plate 10 through the medium of a bolt 17.

Arranged within the casing 16 and secured to the wall 15 thereof through the medium of screws or other fastening elements 18, is a mounting block 19 of insulating material. The block 19 adjacent its upper edge is provided with a threaded socket to receive the threaded end of the bolt 17 as shown in Figure 3.

Mounted on the plate 19 are opposed substantially U-shaped spring switch contacts 20, 21. Also pivotally mounted on the block 19 through the medium of a pivot bolt 22 is a lever 23 of insulating material and secured to the lever 23 through the medium of rivets or other fastening elements, is a contact blade 24 that is in constant sliding contact with a fixed switch contact plate 25 secured as at 26 to the block 19.

Contact 21 is connected with the lamp 6 through the medium of a conductor wire 27 while contact 20 is connected with the signal lamp 7 through the medium of a conductor wire 28. The fixed contact 25 is connected with one side of the battery 8 through the medium of a conductor wire 29.

The lamps 6 and 7 are ground as at 30 and 31 while one side of the battery 8 is grounded as at 32. (See Figure 7.)

From the description of the invention thus far it will be seen that when the switch blade 24 is moved into engagement with contact 21 the circuit will be completed through the lamp 6 for giving a "right turn" signal while when blade 24 is engaged with contact 20 lamp 7 will be illuminated for giving a "left turn" signal. When the blade 24 is in the intermediate position shown, said blade 24 is in neutral position, the position normally occupied and when the vehicle is at rest or moving forwardly.

For swinging the lever 23 and blade 24 associated therewith in the proper direction in the operation of the switch there is provided an operating lever in the form of a bar 33 which is pivoted to the blade 10 as at 34 and has an offset end 35 that extends into the casing 16 and at its free end is notched as at 36 to accommodate a reduced end or extension 37 of the swingable arm 23. Extending from the pivoted end of the lever 23 are suitably shaped arms 37, 38 which are spaced apart so as to accommodate the toe portion of the foot resting on the accelerator pedal 5. It will thus be seen that with the foot resting on the pedal 5 the operator may readily engage the foot with, for example, arm 38 causing the lever 33 to swing about its pivot 34 in a clockwise direction (see Figure 2), and this in turn will cause the arm or lever 23 to swing on its pivot 22 in a counter-clockwise direction to engage blade 24 with contact 20 thereby closing the circuit through the lamp 7 for giving a "left turn."

Manifestly, the operation is substantially the same for giving a "right turn" signal; the foot being brought into engagement with the arm 37 of lever 33 to swing the lever in a counter-clockwise direction and thereby swing the arm 23 in a clockwise direction to engage the switch blade 24 with the switch contact 21 for completing the circuit through the lamp 6.

Swinging movement of the lever 33 in either direction is limited through the medium of stop pins 39 bolted or otherwise secured as at 40 to the plate 10 within the casing 16.

Lever 33 is yieldably retained in an intermediate or neutral position through the medium of a spring keeper 41 that is in the form of a longitudinally bowed spring metal strap the opposite end portions of which are apertured to accommodate the reduced ends of the stop pins 39 as shown in Figure 5. The offset end 35 of lever 33 rides over the bowed or intermediate portion of the keeper 41 and said keeper, as shown in Figure 5, is provided with a depressed portion forming a retaining groove 42 into which the end 35 of the lever 33 moves as said lever approaches its intermediate or neutral position. Obviously, with the end 35 of lever 33 seating within the groove 42 said lever is yieldably held in its neutral position against accidental displacement.

It is thought that a clear understanding of the construction, operation, utility and advantages of a vehicle direction signal switch embodying the features of the present invention will be had without a more detailed description.

Having thus described the invention what is claimed as new is:—

1. In a control switch for a vehicle direction signal, and in combination, an accelerator pedal, a bracket connected with the front end of the pedal and extending forwardly, a casing on the forward end of the bracket, a switch assembly in the casing and including a vertically arranged and pivoted switch arm, a lever pivoted in horizontal position to the bracket and having its forward end forked to engage the lower end of the arm, a pair of spaced arms connected with the rear end of the lever and extending to each side of the front end of the pedal for engagement by the foot of an operator resting on the pedal and means for yieldingly holding the lever in a central and neutral position.

2. An electric switch for use in connection with a vehicle direction signal, said switch embodying a mounting plate and a clamping plate cooperable with one end of the mounting plate for detachably securing the switch to an automobile accelerator pedal with a portion of the pedal clamped between said mounting plate and said clamping plate, a switch casing mounted on said mounting plate, a switch mechanism mounted within said casing and embodying a pivoted switch blade, and an operating lever for the switch pivoted to the mounting plate and having one end operatively connected with said blade for transmitting swinging movement of the lever to the blade, and having at its opposite end a pair of spaced apart arms extending therefrom to accommodate therebetween the toe portion of the foot of the operator to be selectively engaged by the foot whereby to swing said lever in either of two directions.

3. An electric switch for use in connection with a vehicle direction signal, said switch embodying a mounting plate and a clamping plate cooperable with one end of the mounting plate for detachably securing the switch to an automobile accelerator pedal with a portion of the pedal clamped between said mounting plate and said clamping plate, a switch casing mounted on said mounting plate, a switch mechanism mounted within said casing and embodying a pivoted switch blade, and an operating lever for the switch pivoted to the mounting plate and having one end operatively connected with said blade for transmitting swinging movement of the lever to the blade, and having at its opposite end a pair of spaced apart arms extending therefrom to accommodate therebetween the toe portion of the foot of the operator to be selectively engaged by the foot whereby to swing said lever in either of two directions, and means for limiting swinging movement of the lever in either of said directions including means for releasably retaining the lever in an intermediate position.

JOSEPH D. ROMANO.
JOSEPH RIGONI.